United States Patent
Davis et al.

(10) Patent No.: US 6,935,484 B2
(45) Date of Patent: Aug. 30, 2005

(54) CASE TURNING APPARATUS AND METHOD FOR A PALLETIZER

(75) Inventors: O'Neal Wright Davis, Pike Road, AL (US); Terry O'Neal Davis, Pike Road, AL (US); Jason Keith Dour, McKenzie, AL (US); Joe Austin Johnson, Pike Road, AL (US); Brian Kevin Davis, Montgomery, AL (US); Vance Lee Meliska, Montgomery, AL (US)

(73) Assignee: Production Automation Inc., Montgomery, AL (US)

( * ) Notice: Subject to any disclaimer, the term of this patent is extended or adjusted under 35 U.S.C. 154(b) by 0 days.

(21) Appl. No.: 10/602,735

(22) Filed: Jun. 25, 2003

(65) Prior Publication Data

US 2004/0069596 A1 Apr. 15, 2004

(51) Int. Cl.⁷ .............................................. B65G 47/24
(52) U.S. Cl. ...................................... 198/416; 198/411
(58) Field of Search ................................. 198/400, 410, 198/411, 412, 413, 416

(56) References Cited

U.S. PATENT DOCUMENTS

| | | |
|---|---|---|
| 1,759,220 A | 5/1930 | Brown |
| 3,332,531 A * | 7/1967 | Chaney ...................... 198/416 |
| 3,559,782 A | 2/1971 | Lesley et al. |
| 3,815,196 A | 6/1974 | Gotham et al. |
| 3,930,573 A | 1/1976 | Wyman |
| 3,946,880 A | 3/1976 | Schmitt |
| 3,954,190 A | 5/1976 | Howard et al. |
| 4,026,422 A | 5/1977 | Leenaards |
| 4,063,632 A | 12/1977 | Neth et al. |
| 4,067,456 A | 1/1978 | Schmitt |
| 4,132,387 A | 1/1979 | Somerville et al. |
| 4,162,016 A | 7/1979 | Schmitt |
| 4,195,959 A | 4/1980 | Schmitt |
| 4,197,046 A | 4/1980 | Shank |
| 4,239,433 A | 12/1980 | Hanson |
| 4,298,305 A | 11/1981 | Neth |
| 4,316,693 A | 2/1982 | Baxter et al. |

(Continued)

OTHER PUBLICATIONS

Series 6000 In–Line Palletizers (product brochure), Production Automation, Inc., Aug., 2000, 2 pages.
Series 4000 In–Line Palletizers (product brochure), Production Automation, Inc., Aug., 2000, 2 pages.

*Primary Examiner*—James R. Bidwell
(74) *Attorney, Agent, or Firm*—Hunton & Williams LLP

(57) ABSTRACT

In a palletizing machine, cases of goods are received from a production line and are arranged into patterned layers. The palletizing machine stacks the patterned layers one on top of another to form a stacked load that can be easily transported by machine. During arrangement of the cases into the patterned layers, some cases may need to be turned to change their orientation relative to their direction of travel. The cases can be turned simultaneously in groups of two, three, or more cases, to minimize the contact of the palletizing machine with the cases during turning. The turning device which bears against the case during turning may also be provided with a component of movement in the direction of case travel so as to effect the speed of the collision when the cases contact the turning device and effect the net speed between the cases and the turning device during turning.

13 Claims, 10 Drawing Sheets

U.S. PATENT DOCUMENTS

| | | | |
|---|---|---|---|
| 4,498,573 A | | 2/1985 | Anderson et al. |
| 4,681,203 A | | 7/1987 | Kornylak |
| 4,930,615 A | * | 6/1990 | Nash .......................... 198/411 |
| 4,993,536 A | | 2/1991 | Bell |
| 5,062,613 A | | 11/1991 | Petrachkoff |
| 5,092,447 A | | 3/1992 | Wyman |
| 5,096,050 A | | 3/1992 | Hodlewsky |
| 5,118,243 A | | 6/1992 | Huebner et al. |
| 5,188,211 A | | 2/1993 | Ringot et al. |
| 5,195,627 A | | 3/1993 | Wyman |
| 5,213,193 A | * | 5/1993 | Mullins ...................... 198/416 |
| 5,518,103 A | * | 5/1996 | Achelpohl et al. .......... 198/416 |
| 5,548,198 A | | 8/1996 | Backstrand |
| 5,660,262 A | | 8/1997 | Landrum et al. |
| 5,967,292 A | | 10/1999 | Corrales |
| 6,067,456 A | | 5/2000 | Duran |
| 6,082,523 A | | 7/2000 | Weeks |
| 6,454,082 B1 | | 9/2002 | McTaggart et al. |
| 6,464,217 B1 | | 10/2002 | Kulpa et al. |
| 6,499,583 B1 | | 12/2002 | Sohlberg |
| 6,516,940 B1 | | 2/2003 | Hart et al. |

* cited by examiner

CASE TURNING APPARATUS AND METHOD FOR A PALLETIZER

BACKGROUND OF THE INVENTION

This invention relates to the field of automated palletizing of cased goods.

In an automated palletizing machine, called palletizers in the trade, cases of goods are received from a production line on an infeed conveyor. The cases of goods can be, for example, aluminum cans filled with beverages and wrapped in cardboard boxes, plastic water bottles shrink-wrapped together, or any other case or bundle. The cases of goods can be any product packaged in a similar manner or shape as these examples that is ready to be further packaged on a pallet. The palletizer groups the cases in layers, then successive layers are stacked on top of one another to form a load. The load of cases in turn can be stacked on top of a base, such as a pallet, that facilitates movement of the load by machine, such as by a forklift. The palletizer arranges the cases into layers and stacks them at a rapid pace—a pace equaling the speed at which the cases are received from the infeed conveyor.

For stability, the layers of cases can be arranged into a pattern. The patterns of adjacent layers may be alternated so that the load of cases is well supported, secure, and balanced. In order to arrange the cases in a layer into a desired pattern appropriate for stacking on top of the previous layer, it may be necessary to turn some of the cases as the layer is formed so that certain cases have a different orientation relative to the layer than others.

During the process of case turning, the cases can be damaged. Typically a prior art turning device comes into contact with a portion of the case while the case is traveling forward in a direction of case travel on the conveyor system of the palletizer. The turning device pushes on one end of the case and temporarily slows the forward movement of the one end of the case while the other end of the case continues to move forward at a greater speed than the one end. The difference in the forward speed of each end of the case causes the case to rotate. The contact of the turning device with the cases during case turning can generate significant forces when the cases are traveling at high speeds. As a result, the packaging of the case, or even the product itself, can be damaged during case turning. Also, case turning can cause the palletizer to operate unreliably. The case turning can cause the packaging of the case to come loose and jam the machinery of the palletizer. The case turning machinery itself can wear more quickly than other components of the palletizer because of its harsh contact with the cases. As a result of its more rapid wear, the case turning machinery can necessitate more frequent maintenance and down time of the palletizer. In addition, to operate effectively the case turning procedure can require the palletizer to operate at a lower case per minute speed than it might otherwise operate if the case turning did not occur.

Thus, benefit can be had from case turning that operates reliably and quickly, while causing less damage to the cases, so that losses from damaged cases can be minimized and so that the palletizer can be run at a more rapid pace and more reliably.

DETAILED DESCRIPTION OF THE PREFERRED EMBODIMENTS

Figure 1A:
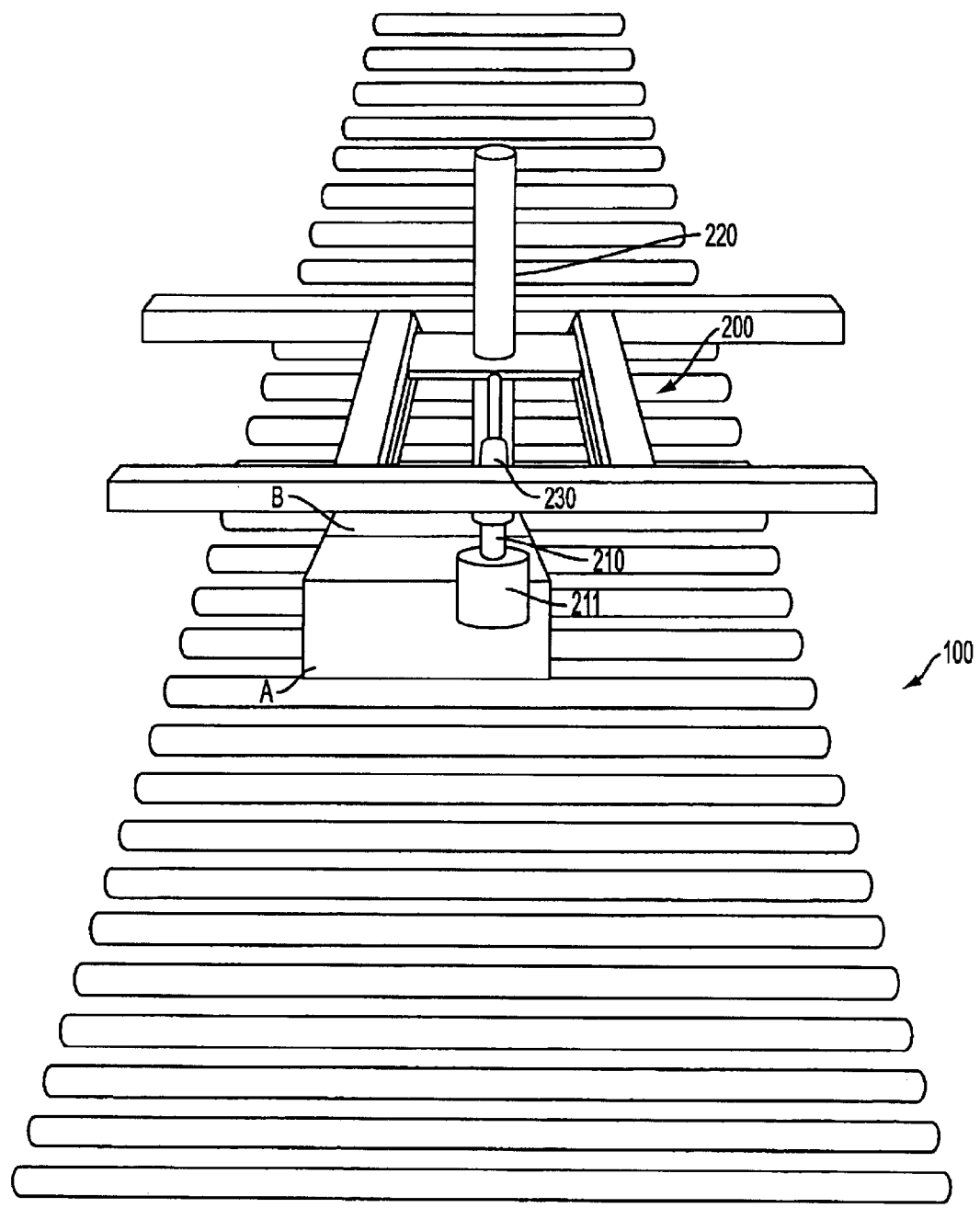
FIGS. 1A–1D schematically illustrate a case turning device which, according to one aspect of the invention, is turning more than one case simultaneously.

For convenience, similar elements are designated throughout the drawing figures with the same reference numerals.

The invention provides various methods of improving the turning of cases on a palletizer and palletizers capable of carrying out the various methods. In one aspect of the invention, cases may be turned simultaneously in groups through a single turning operation, rather than individually, in order to reduce the number of collisions that are necessary to turn the cases and form the desired pattern. For example, if contiguous first and second cases are to be oriented 90 degrees relative to the direction of case travel on the palletizer, then the two cases can be turned simultaneously in the same turning operation by the turning device contacting the first case only. The first case is turned by the contact with the turning device, and the second case is turned simultaneously due to its contact with the first case.

Figure 1B:
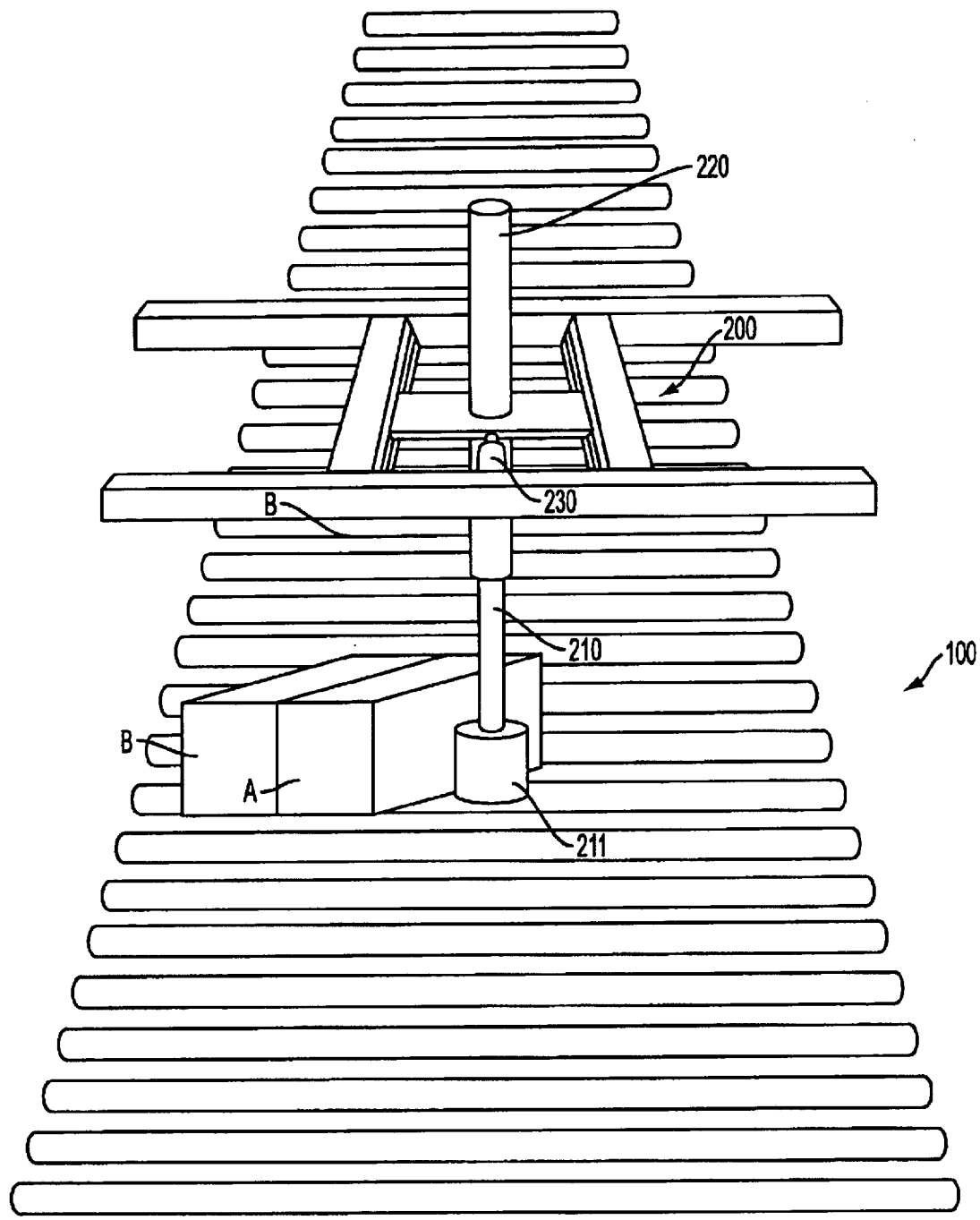
Figure 1C:
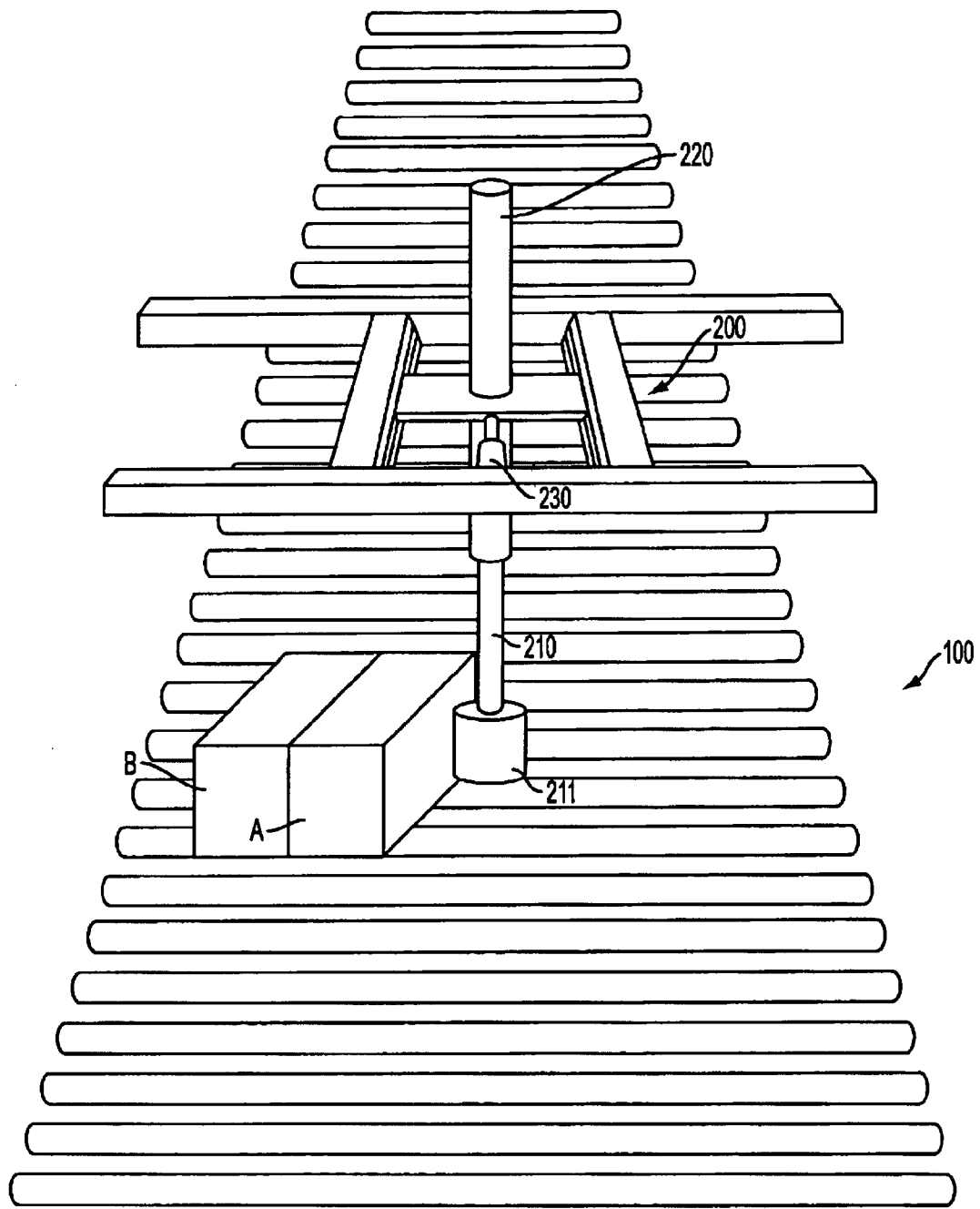
Figure 1D:
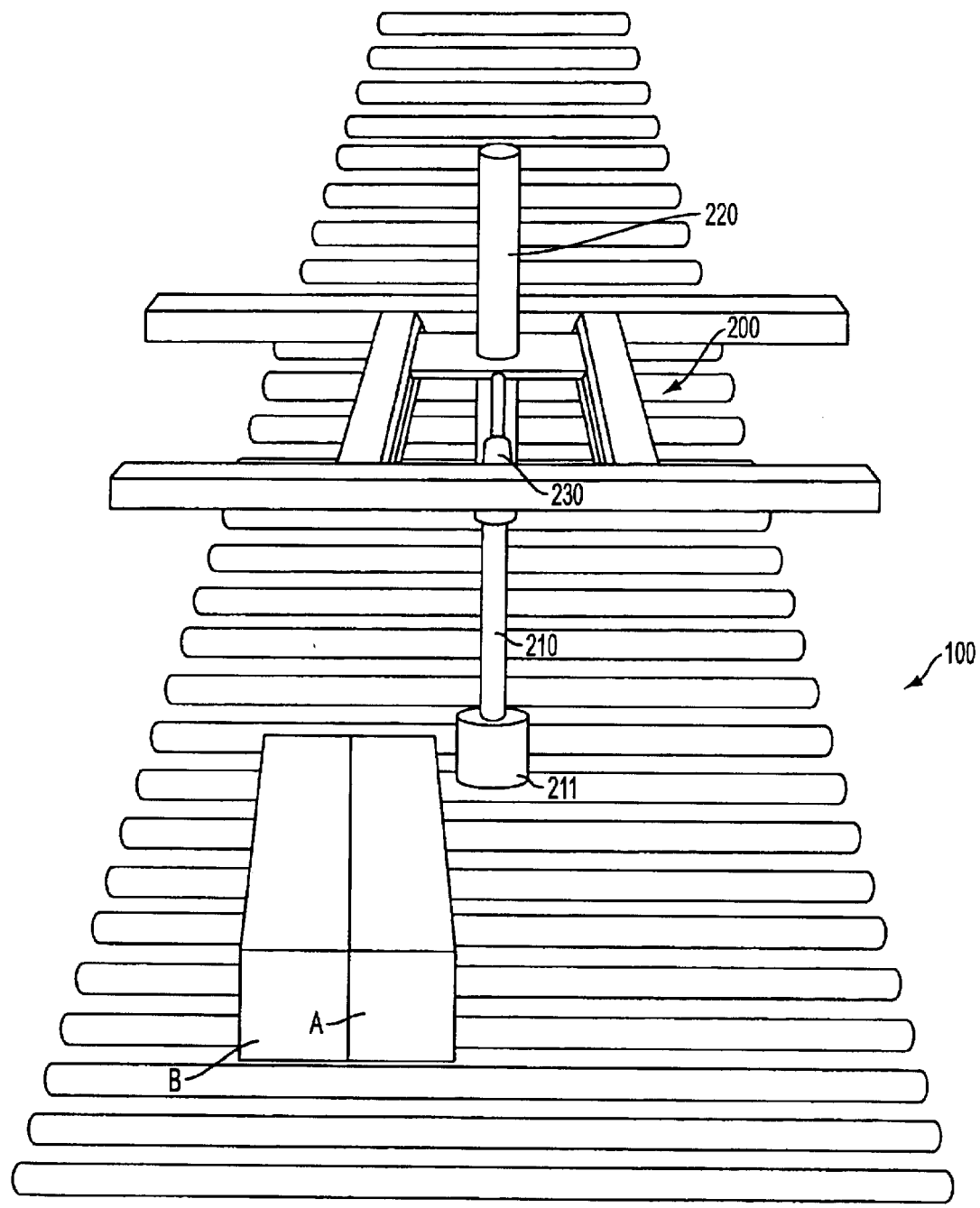

FIGS. 1A–1D illustrate this procedure. In FIG. 1A, a first case A and a second case B are moving in the direction of case travel on a conveyor system 100 towards a turning device 200. Case A and case B are oriented so that their longitudinal dimension is perpendicular to the direction of case travel. In this example, the first case A and the second case B are touching one another, but it is possible for there to be initially some gap between the cases. In FIG. 1B, the turning device 200 has collided with a first end of the first case A causing the speed of the first end of case A in the direction of case travel to be reduced. A second end of case A is permitted to continue its movement in the direction of case travel at a speed greater than the first end, thus causing the case A to turn about an axis normal to the direction of case travel. Because of its contact with the case A, case B also begins to turn. In FIG. 1C case A has completed most of its turn and case B has completed most of its turn. In FIG. 1D, case A is no longer in contact with the turning device 200, and case A and case B have each completed their simultaneous turn and have been reoriented 90 degrees relative to the direction of case travel.

Figure 2:
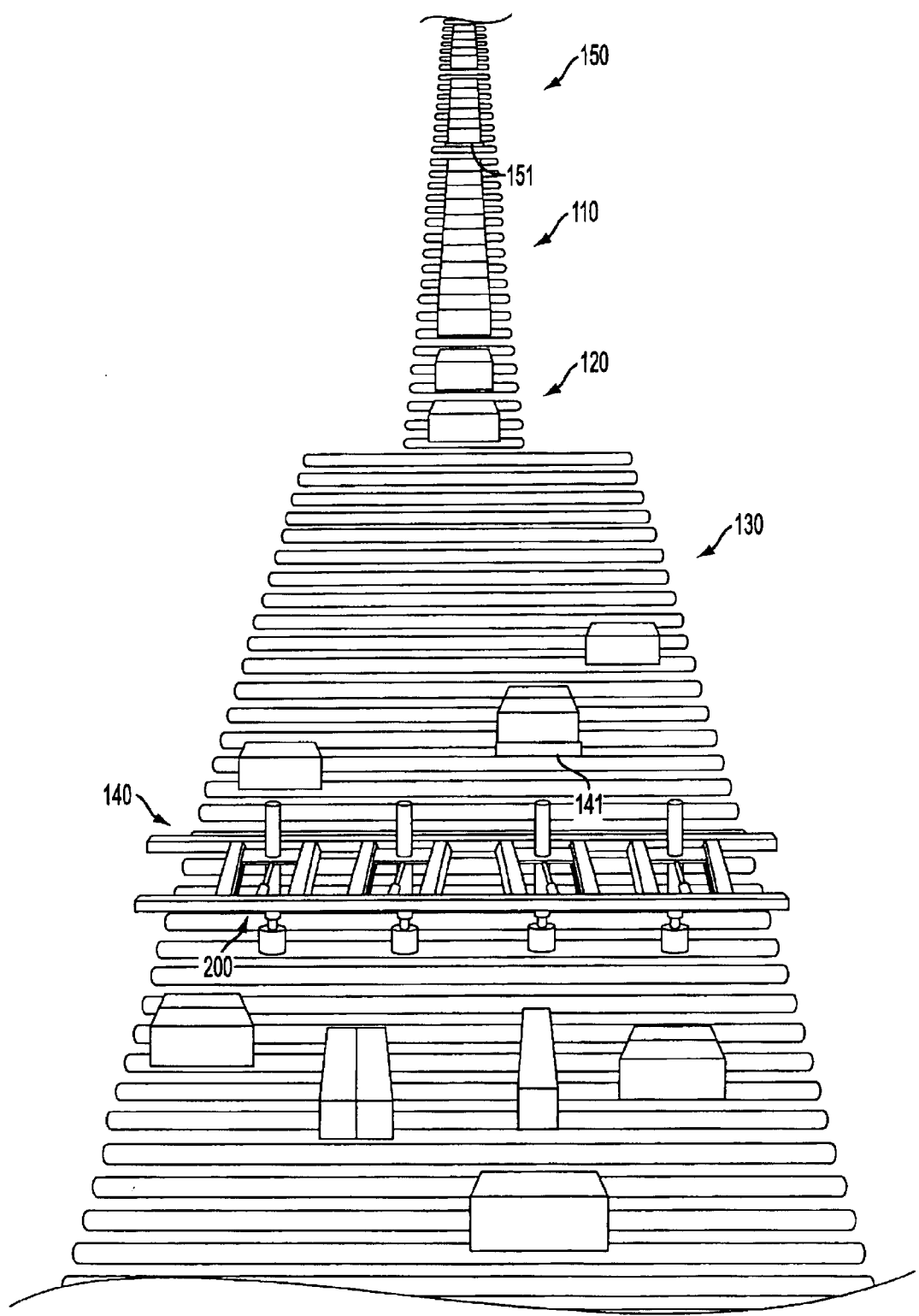
FIG. 2 schematically illustrates a palletizer, and various sections of a conveyor system including an accumulator conveyor and an infeed conveyor.

As previously stated, the cases are turned by a turning device 200. The turning device 200 could be an arm which moves laterally relative to the direction of case travel from a first lateral position, or rest position, outside of the path of the cases to a second lateral position in the path of the cases to collide with the cases. Such an arrangement is shown, for example, in FIG. 2a of U.S. Pat. No. 6,499,583. Or, as illustrated in the drawings herein, the turning device 200 may comprise a rod 210 which moves vertically from a first vertical position, or rest position, out of the path of the cases to a second vertical position where the turning device will collide with the cases. FIG. 1A shows the rod 210 in the first vertical position where it will not collide with the cases. FIGS. 1B–1D show the rod 210 in its second vertical position where it will collide with the cases. This type of turning device is called a pin turner in the trade. The turning device 200 may comprise other arrangements that will be recognizable to those of skill in the art.

The turning device 200 also comprises an actuating means for moving the turning device from its rest position to a position where it will collide with the cases. The actuating means may comprise a pneumatic cylinder, a linear motor, a lead screw, a rack and pinion, a belt and pulley system, or any of a number of other known and functionally comparable actuating systems. In the drawings herein, a pneumatic cylinder 220 is provided as the actuating means.

According to this aspect of the invention, because multiple cases are turned together, the number of collisions between the turning device and the cases is reduced. The number of collisions is less than the total number of cases that are turned. While only the simultaneous turning of two cases has been described and illustrated, more than two cases may also be turned simultaneously in a similar manner. Of course, the same apparatus capable of turning multiple cases together may also be used to turn individual cases independently, or may also be used to turn selective multiple cases together and selective individual cases independently, as desired.

In another aspect of the invention, the speed at which the cases move on the conveyor system of the palletizing machine can be reduced as the cases enter the portion of the conveyor system where the cases are turned. In one embodiment of a palletizer illustrated in FIG. 2, the cases are received from an infeed conveyor 110 at a first speed, measured in cases per minute. The cases on the infeed conveyor may be stacked back-to-back with all of the cases touching. The speed of the cases is next increased to a second speed greater than the first speed by a spacing conveyor 120 to produce a gap for counting the number of cases, and to feed the cases onto a line divider 130 which moves the cases into various lateral paths relative to their direction of travel. Because the cases may be turned simultaneously with one case touching one another, the gap between the cases does not necessarily need to be maintained in the turning area 140 of the palletizer. Thus, the speed of the conveyors in the turning area 140 can be decreased to a third speed that is less than the second speed, and greater than or equal to the first speed. Multiple cases will then arrive at the turning device 200 approximately back-to-back and touching one another—ready to be turned simultaneously. Because of the reduction in the speed of the cases in the turning area 140 of the palletizer, the collision speed of the cases with the turning device 200 is reduced and the forces generated during the collision are reduced, resulting in avoidance of some damage to the cases.

Alternatively, if the speed of the cases is not slowed adequately so that the cases arrive at the turning device 200 back-to-back, a retractable stop 141 can be provided in the conveyor system 100 before the turning device 200 in order to group several cases together to be turned simultaneously. The stop 141 can selectively hold a case or group of cases stationary on the conveyor system 100 until the cases to be turned simultaneously have been grouped together and are touching one another. Then the stop 141 is retracted and the group of cases moves forward again in the direction of case travel toward the turning device 200.

If the groups of cases to be turned simultaneously arrive at the turning device already touching one another, then there would be no need for a stop to temporarily hold the cases stationary for grouping.

In order for the reduction in speed of the cases in the turning area 140 to consistently position the cases in close proximity to one another without using any stops 141, the infeed conveyor 110 must deliver cases continuously to the palletizer. In order to ensure that the infeed conveyor 110 delivers cases continuously to the palletizer, an accumulator conveyor 150 may be provided with a retractable stop 151. The retractable stop 151 will temporarily hold the cases until enough cases are accumulated in the accumulator conveyor 150 to make up an entire layer of cases for the load. The retractable stop 151 will then be retracted and permit the cases to move forward in the direction of case travel to the infeed conveyor 110 with each of the cases being back-to-back. It is also possible to simply turn off the accumulator conveyor 150 and let cases collect on this conveyor until enough cases have been accumulated to make up an entire layer of cases for the load. Then the accumulator conveyor 150 is turned back on to convey the cases forward in the direction of case travel to the infeed conveyor 110 with each of the cases being back-to-back.

In another aspect of the invention, the turning device 200 may be provided with a component of movement in the direction of case travel. When the cases collide with the turning device 200, the turning device can be moved forward in the direction of case travel to reduce the net speed of the collision. Because of the reduction in the net speed of the collision with the turning device 200, collision forces on the cases are reduced and some damage to the cases can be avoided.

FIGS. 1A–1D also illustrate this movement of the turning device 200 in the direction of case travel. In FIG. 1A the turning device is situated in its default horizontal position. In FIG. 1B, the turning device 200 is colliding with case A and the turning device is moving in the direction of case travel to reduce the net collision speed.

An actuation means is provided for moving the turning device 200 in the direction of case travel. The actuating means may comprise a pneumatic cylinder, a linear motor, a lead screw, a rack and pinion, a belt and pulley system, or any of a number of other known and functionally comparable systems. In the drawings herein, a pneumatic cylinder 230 is provided as the actuating means for moving the turning device in the direction of case travel. Before the turning device 200 collides with the case, the actuating means can actuate the turning device to move the turning device in the direction of case travel, thus reducing the net speed of the collision.

As used herein, the description of a turning device moving in a direction of case travel will be met not only when the turning device is moving substantially parallel to the movement of the cases, but also when the turning device is moving in a direction diagonal to the movement of the cases, or is moving in some other direction, so long as the turning device has at least a component of movement in the direction of case travel.

Figure 3:
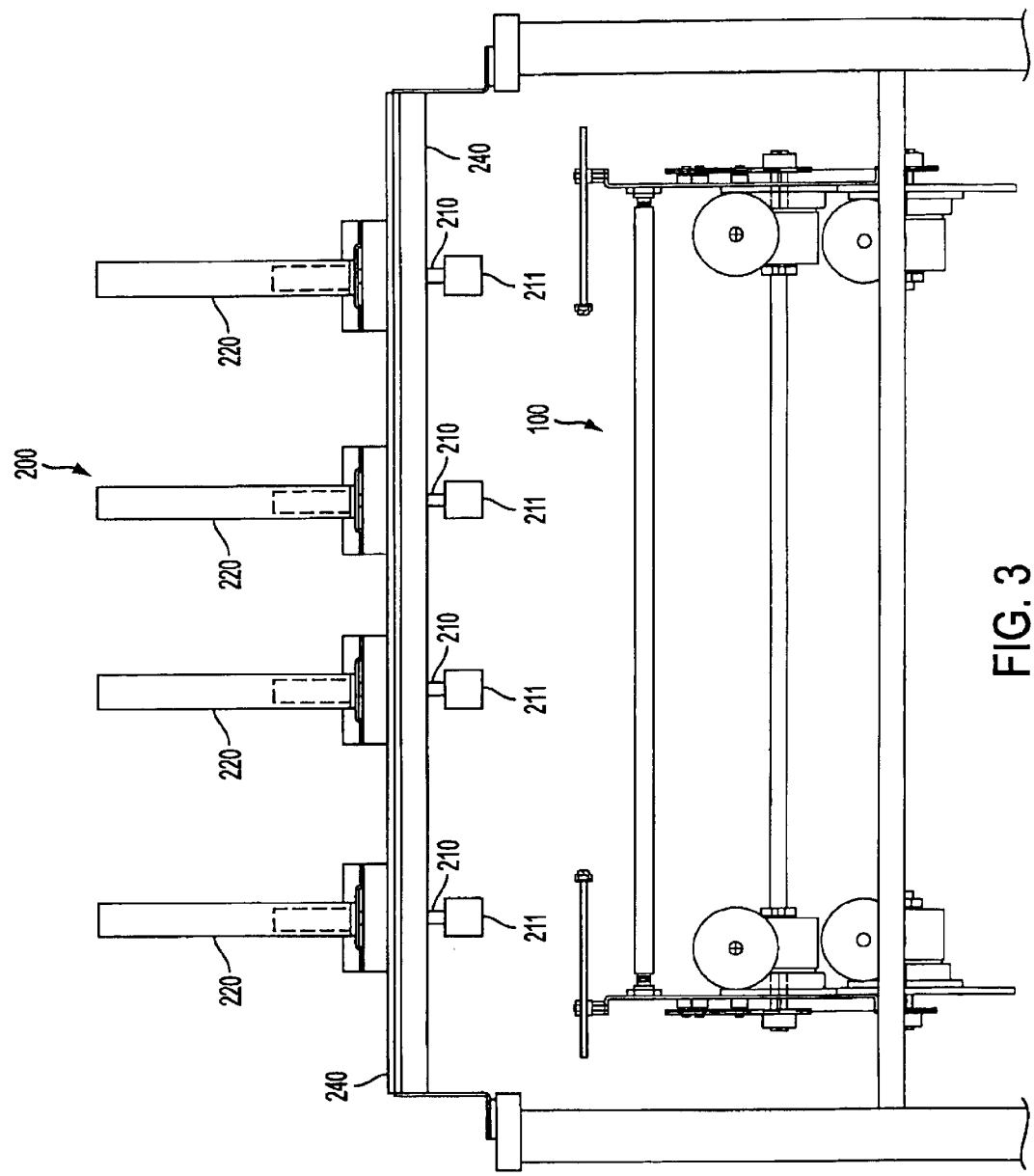
FIG. 3 is a front view of one embodiment of a turning device employing four pin turners which are each capable of movement in the direction of case travel to reduce the net speed of collisions with the cases.
Figure 4:
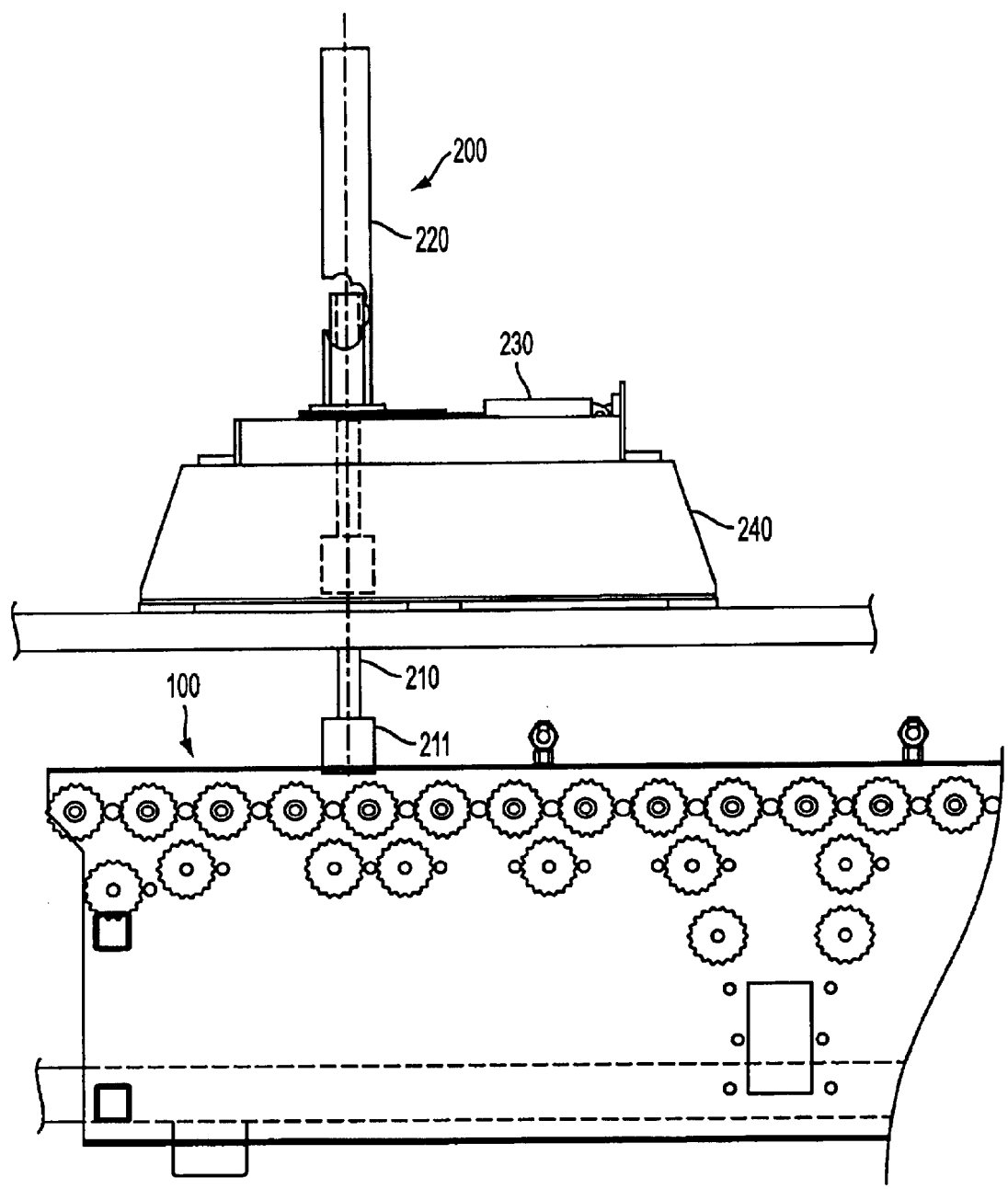
FIG. 4 is a side view of the turning device of FIG. 3.
Figure 5:
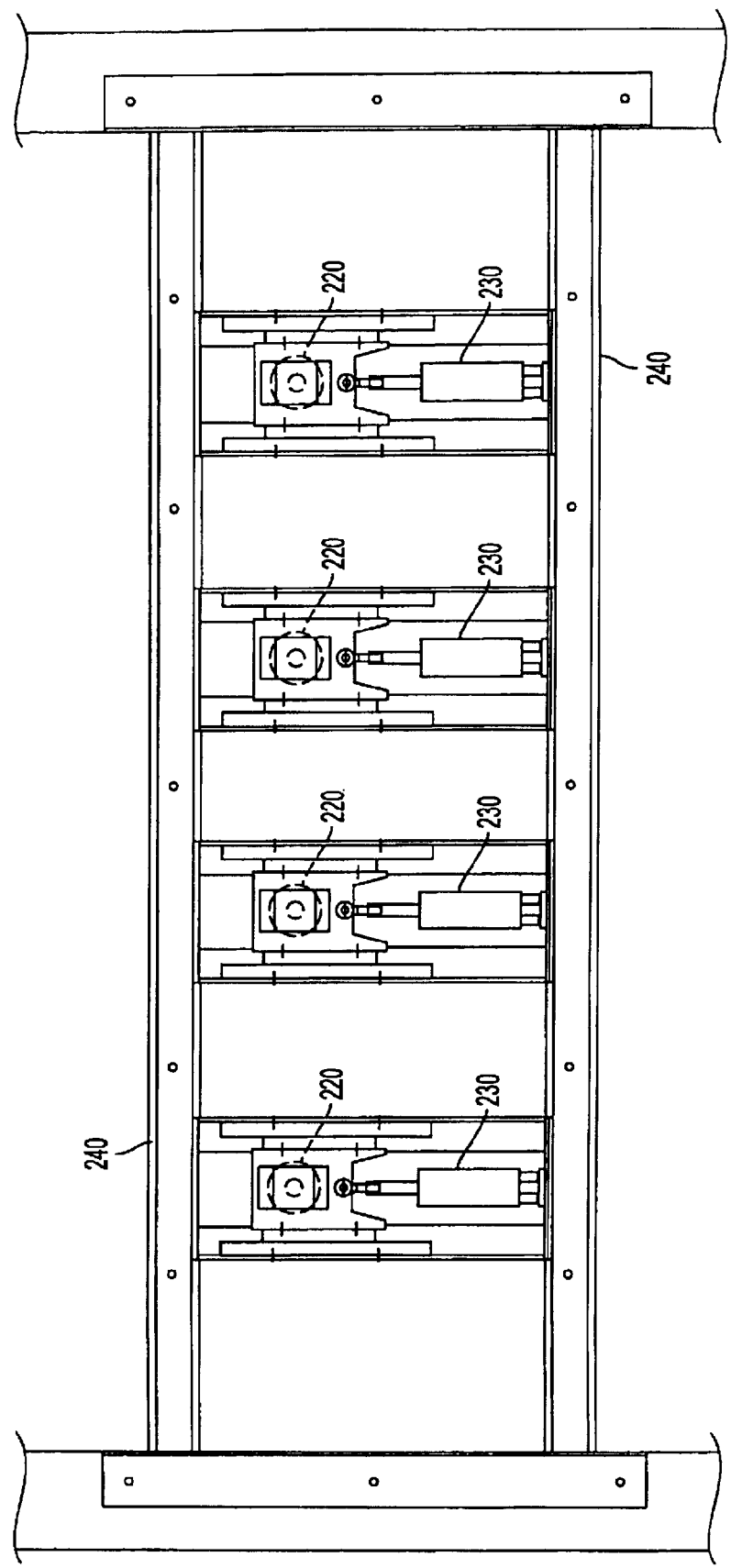
FIG. 5 is a top view of the turning device of FIG. 3.

FIGS. 3–5 illustrate one embodiment of a case turning device 200 with a component of movement in the direction of case travel. In the embodiment of FIGS. 3–5, the turning device comprises a rod 210 that is actuated between a first vertical position and a second vertical position by a pneumatic cylinder 220. The rod may include a plastic roller 211 on the end thereof, or some type of a cushion, for softening the impact with the cases. The subassembly of the rod 210 and the pneumatic cylinder 220 are supported for sliding movement in the direction of case travel on a frame system 240. To move the turning device 200 between first and second horizontal positions in the direction of case travel, pneumatic cylinder 230 actuates the subassembly of the rod 210 and the pneumatic cylinder 220.

The actuating means for moving the turning device 200 in the direction of case travel may actively actuate, for example by a pneumatic power system coupled to a pneumatic cylinder, or may passively actuate, for example by a mechanical or air spring. Passive actuation would occur with an air spring when a case collides with the rod 210 and the fluid within the cylinder 230 is compressed as the rod 210 moves in the direction of case travel under force of the case. The air spring could be constructed by closing the end of the cylinder 230 so that movement of the rod 210 toward the cylinder 230 compresses the fluid in the cylinder. The cylinder might also include a damper for damping the movement of the rod 210.

Figure 6A:
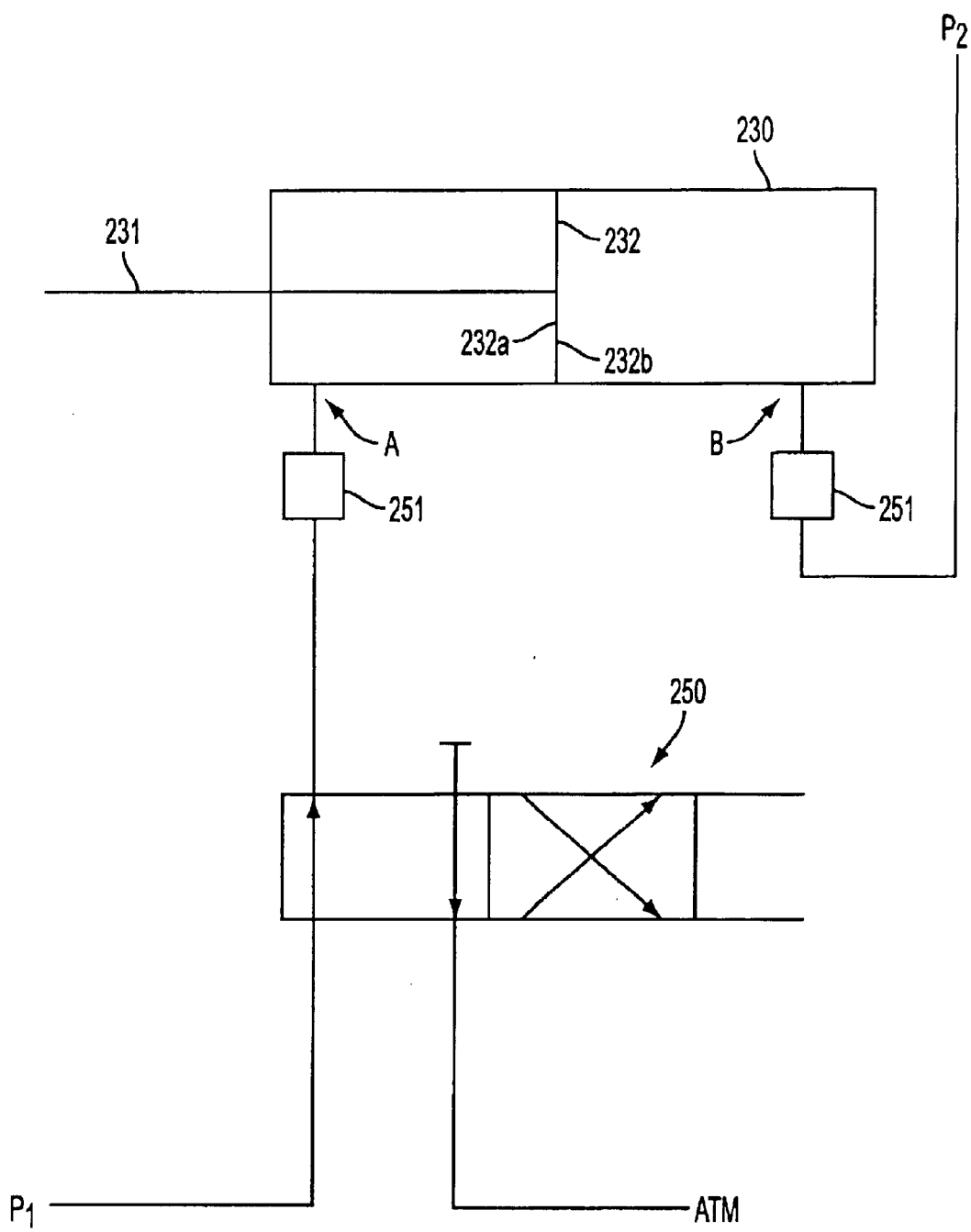
FIG. 6A is an embodiment of an actuator for moving a turning device in the direction of case travel.

FIG. 6A illustrates one version of an actuator for moving the turning device 200 in the direction of case travel. In this version the cylinder 230 is double-actuated with one port A positioned on the rod side of the piston 232a and another port B positioned on the other side of the piston 232b. Port B is connected to a source of constant pressure fluid $P_2$, such as compressed air. Port A is connected to a valve 250. In its de-energized, or rightward position illustrated in FIG. 6A, valve 250 connects port A to another source of constant pressure fluid $P_1$. The pressure of the fluids $P_1$ and $P_2$ at ports A and B can be selected so that the pressure differential on each side of the piston 232, and the area differential resulting from having rod 231 attached to the rod side of the piston 232a, cause the piston to be near a force equilibrium with the net force pushing the piston to the left end of cylinder 230 in FIG. 6A. Thus the rod 231 would extend out of cylinder 230 until the force of a case colliding with the turning device 200 pushes the rod 231 back into cylinder 230 and the piston 232 to the right end of cylinder 230. Once the force of the case collision is removed, the rod 231 would be extended again from cylinder 230. In order to manually extend rod 231 or to retain rod 231 in a fully extended position, valve 250 may be energized to move to its energized, or leftward position in FIG. 6A, so that port A is connected to the atmosphere ATM. In this case the pressure on the rod end of the piston 232a would be removed and the net force on the piston 232 would cause the piston to move to the left end of cylinder 230 in FIG. 6A and the rod 231 to extend. Dampers 251 can be used with port A and/or port B to control the flow of the fluid and affect the speed of rod 231. One advantage of this version of an actuator is that it can handle a wide range of case weights and speeds.

As used herein, the description of the turning device 200 moving in, or being propelled in the direction of case travel during collision with the cases is met i) when the turning device is actively actuated by moving the turning device with an active actuator independent of the occurrence of a collision with a case, or ii) when the turning device is moved in response to the collision with the turning device actuated by an actuating means which passively responds to the force of the collision, such as a spring.

While reducing the impact forces, the slowing of the net collision speed through either the reduction in the speed of the cases in the turning area 140 of the palletizer, and/or through the movement of the turning device 200 in the direction of case travel during the collision can cause poor turns where all the cases are not consistently reoriented to the desired orientation. In order to prevent poor turns, it may be necessary to move the turning device 200 in the opposite direction of case travel throughout the case's turn or near the end of the turn. When the turning device 200 is moved in the opposite direction of case travel, the net speed between the cases and the turning device is increased. Of course, when the turning device 200 is provided with an actuation means that is used to move the turning device 200 in the direction of case travel during collisions with the cases, the same actuation means can also be used to move the turning device in the opposite direction of case travel near the end of a case's turn. FIGS. 1A–1D also illustrate this procedure. In FIG. 1B, as was previously described, the turning device 200 has been moved the full extent of its travel in the direction of case travel in order to reduce the net collision speed with case A. In FIG. 1C, the actuation means has begun to move the turning device 200 in the opposite direction of case travel in order to increase the net speed of case A relative to the turning device. In FIG. 1D, the turning device has returned to its first horizontal position of FIG. 1A.

Figure 6B:
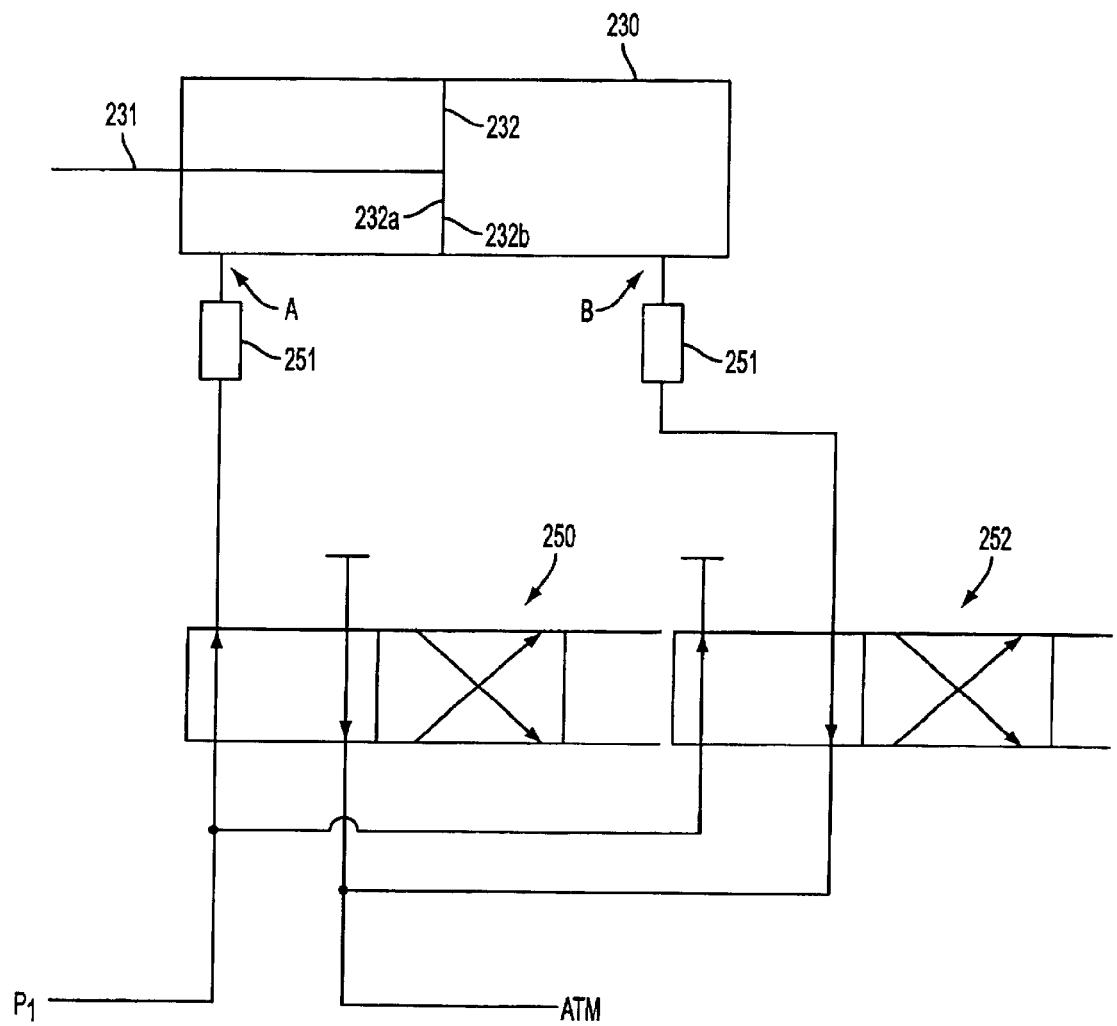
FIG. 6B is an embodiment of an actuator for moving a turning device both in the direction of case travel and opposite the direction of case travel.

FIG. 6B illustrates one version of an actuator for moving the turning device 200 both in the direction of case travel and opposite the direction of case travel. In FIG. 6B the cylinder 230 is double-actuated with a port A on the rod side of the piston 232a and another port B positioned on the other side of the piston 232b. Port A is connected to valve 250. In its de-energized, or rightward position illustrated in FIG. 6B, valve 250 connects port A to a source of constant pressure fluid $P_1$, such as compressed air. Port B is connected to valve 252. In its de-energized, or rightward position illustrated in FIG. 6B, valve 252 connects port B to the atmosphere ATM. With valves 250 and 252 each in their de-energized positions, there is pressurized fluid only on the rod side of the piston 232a. Thus the piston 232 will be moved to the right end of cylinder 230 in FIG. 6B, and rod 231 will be retracted. If valve 252 is energized to move to its energized, or leftward position in FIG. 6B, then port B will also be connected to $P_1$. In this case, with equal pressure on the rod side of the piston 232a and the other side of the piston 232b, the area differential between 232a and 232b causes a force differential on piston 232 with the net force moving the piston to the left end of cylinder 230 and extending rod 231. The piston 232 is near a force equilibrium such that the force of a case colliding with the turning device 200 will cause the piston 232 to move rightward in FIG. 6B and the rod 231 to retract.

If valve 250 is now energized to move to its energized, or leftward position in FIG. 6B, then port A will be connected to ATM. Then the pressure on the rod side of the piston 232a will be removed and the piston 232 will be moved leftward in FIG. 6B and the rod 231 will extend. The extending rod 231 can move the turning device 200 in the opposite direction of case travel to increase the net speed between the turning device and the cases to correct poor turns. Dampers 251 may be used with port A and/or port B to control the flow of the fluid and affect the speed of rod 231.

Whether it is necessary to move the turning device 200 opposite the direction of case travel to assist with the turn is dependent upon the case speed and the case weight, among other factors. Slower moving cases and heavier cases may require this assistance, while faster moving cases and lighter cases may not.

Although the invention has been described through a description of a particularly preferred arrangement of components, and through a description of a particular sequence of steps in a method, various alternative configurations, alternative steps, and alternative step sequences are also possible. Modifications to the preferred embodiments will be readily apparent to those skilled in the art without departing from the spirit and scope of the invention. Thus, the foregoing descriptions of the preferred embodiments are illustrative only and are not intended to limit scope of the invention to the preferred embodiments. The scope of the invention shall be defined by the appended claims.

We claim:

1. A method of turning cases of goods moving in a direction of case travel on a conveyor system comprising:
   providing a case moving in the direction of case travel at a first speed;
   propelling in the direction of case travel a turning device in a path of the case at a speed less than the first speed;
   contacting the case with the turning device while the turning device is moving in the direction of case travel at a speed less than the first speed; and
   stopping the turning device and thereby pushing against the case with the turning device to cause the case to turn about an axis normal to the direction of case travel.

2. The method of claim 1 further comprising:
   propelling the turning device in a direction opposite the direction of case travel after the turning device first contacts the case and while the turning device is pushing against the case to assist in turning the case.

3. The method of claim 2 wherein:
   the case is first moved on an infeed conveyor, and the first speed is the speed of the infeed conveyor; and
   after moving on the infeed conveyor, the case is moved on a spacing conveyor at a second speed greater than the first speed.

4. The method of claim 3 further comprising:
   contacting a second case with the first case while the first case is turning and pushing against the second case with the first case whereby the second case turns simultaneously with and in response to the turning of the first case.

5. A method of turning cases of goods moving in a direction of case travel on a conveyor system about an axis normal to the direction of case travel, the method comprising:
   propelling the cases in the direction of case travel with the longitudinal dimension of the case perpendicular to the direction of case travel;
   contacting only a first case with a turning device, the turning device pushing against and temporarily slowing the movement of a first end of the first case in the direction of case travel, while permitting a second end of the first case to move more rapidly than the first end in the direction of case travel to cause the first case to turn;
   contacting a second case with the first case and pushing against the second case with the first case whereby the second case turns simultaneously with and in response to the turning of the first case.

6. The method of claim 5 wherein:
   the cases are propelled on a first conveyor section at a first speed, then propelled on a second conveyor section at a second speed greater than the first speed whereby a space between successive cases is increased, and then propelled on a third conveyor section at a third speed less than the second speed.

7. The method of claim 6 wherein the third speed is greater than or equal to the first speed.

8. The method of claim 5 wherein contacting a first case with a turning device further comprises contacting a first case with a turning device while the turning device is moving in the direction of case travel.

9. The method of claim 8 wherein contacting a first case with a turning device further comprises moving the turning device in a direction opposite the direction of case travel while the first case is turning and the turning device is in contact with the first case.

10. A palletizing machine for arranging cases of goods in a patterned layer and then stacking the patterned layers one on top of another to form a load, the palletizing machine comprising:
    a conveyor system upon which the cases move in a direction of case travel;
    a turning device movable from a first vertical position above the cases on the conveyor system to a second vertical position wherein the turning device will collide with a case traveling in-line with the turning device, the turning device movable between the first vertical position and the second vertical position to collide with selective cases causing the selective cases to turn around an axis normal to the direction of case travel;
    first actuating means for moving the turning device between the first vertical position and the second vertical position;
    the turning device also being movable between a first position and a second position spaced from the first position in the direction of case travel; and
    a second actuating means for moving the turning device between the first position and the second position.

11. The palletizing machine of claim 10 wherein the conveyor system further comprises:
    an infeed conveyor propelling the cases at a first speed;
    a spacing conveyor propelling the cases at a second speed greater than the first speed; and
    a third conveyor section after the spacing conveyor propelling the cases at a third speed less than the second speed, wherein the cases collide with the turning device while on the third conveyor section.

12. A method of turning cases of goods moving in direction of case travel on a conveyor system about an axis normal to the direction of case travel, the method comprising:
    providing a case moving in the direction of case travel;
    contacting the case with a turning device while the turning device is stationary or moving in the direction of case travel;
    pushing against the case with the turning device to cause the case to turn about an axis normal to the direction of case travel while the turning device is moving in a direction opposite the direction of case travel.

13. A method of turning cases of goods on a palletizer moving in a direction of case travel on a conveyor system about an axis normal to the direction of case travel, the method comprising:
    propelling a first case and a second case in close proximity to one another along a conveyor system in the direction of case travel with the longitudinal dimension of each case generally perpendicular to the direction of case travel;
    turning the first case and the second case approximately simultaneously about an axis normal to the direction of case travel to a new orientation where the longitudinal dimension of each case is generally parallel to the direction of case travel and the first case and the second case are in close proximity to one another;

wherein at least at some point in time during the turning of the first case and the second case, the first case is in contact with the second case and pushes against the second case whereby the second case turns in response to the turning of the first case; and propelling the first case and the second case in close proximity to one another in the direction of case travel with the longitudinal dimension of each case generally parallel to the direction of case travel to an area of the conveyor system where the first and the second case are assembled along with other cases into a patterned layer of cases to form a load.

* * * * *